US011841143B2

(12) United States Patent
Wagenfeld et al.

(10) Patent No.: US 11,841,143 B2
(45) Date of Patent: Dec. 12, 2023

(54) DEVICE FOR PURIFYING EXHAUST GASES FROM A FIREPLACE

(71) Applicant: Kutzner + Weber GmbH, Maisach (DE)

(72) Inventors: Rolf Wagenfeld, Maisach (DE); Andreas Wesel, Maisach (DE); Tim Baranowski, Maisach (DE); Mathias Lindenmüller, Maisach (DE)

(73) Assignee: Kutzner + Weber GmbH, Maisach (DE)

( * ) Notice: Subject to any disclaimer, the term of this patent is extended or adjusted under 35 U.S.C. 154(b) by 321 days.

(21) Appl. No.: 17/198,795

(22) Filed: Mar. 11, 2021

(65) Prior Publication Data
US 2021/0285646 A1   Sep. 16, 2021

(30) Foreign Application Priority Data
Mar. 12, 2020   (DE) ............... 10 2020 106 773.9

(51) Int. Cl.
*F24B 1/192* (2006.01)
*F23J 15/02* (2006.01)
*F24B 1/191* (2006.01)

(52) U.S. Cl.
CPC ............ *F24B 1/192* (2013.01); *F23J 15/022* (2013.01); *F24B 1/1915* (2013.01)

(58) Field of Classification Search
CPC ....... F24B 1/192; F24B 1/1915; F23J 15/022; F23J 2219/10; B03C 3/15; B01D 53/86; B01D 53/75
See application file for complete search history.

(56) References Cited

U.S. PATENT DOCUMENTS 2,553,962 A * 5/1951 Duford ............... F24B 15/04
                                                 187/255
2,609,063 A * 9/1952 Francis ............... F23J 11/00
                                                  96/389

(Continued)

FOREIGN PATENT DOCUMENTS

AT         412533 B    9/2004
CN      204648581 U    9/2015

(Continued)

OTHER PUBLICATIONS

European Application No. EP21161892.1, Extended European Search Report, dated Aug. 13, 2021, 7 pages.

*Primary Examiner* — David J Laux
(74) *Attorney, Agent, or Firm* — Kilpatrick Townsend & Stockton LLP

(57) ABSTRACT

The present invention relates to a device for cleaning exhaust gases from a fireplace, comprising a housing which accommodates functional components of the device, an inlet portion provided to receive exhaust gases from the fireplace, an outlet portion provided to discharge exhaust gases from the device, a bypass portion which is configured to establish a direct connection between the inlet portion and the outlet portion and which can be closed by means of a first mechanical flap arrangement, and a cleaning portion which extends between the inlet portion and the outlet portion for guiding an exhaust gas flow and is provided with a plurality of functional components, wherein the functional components at least comprise an electrostatic filter unit for separating fine dust particles, a centrifugal separator unit for removing particles from the exhaust gas, and a fan unit for driving a flow of the exhaust gas through the cleaning portion.

20 Claims, 1 Drawing Sheet

(56) References Cited

U.S. PATENT DOCUMENTS

| | | | | |
|---|---|---|---|---|
| 4,274,393 A | * | 6/1981 | Scaran | F24B 1/185 |
| | | | | 126/550 |
| 4,657,738 A | * | 4/1987 | Kanter | B01D 53/60 |
| | | | | 422/186.21 |
| 4,675,029 A | * | 6/1987 | Norman | B03C 3/017 |
| | | | | 96/97 |
| 4,699,317 A | * | 10/1987 | Childs | F24B 7/005 |
| | | | | 237/55 |
| 6,089,023 A | | 7/2000 | Anderson et al. | |
| 8,812,162 B2 | * | 8/2014 | Schneider | G05B 15/02 |
| | | | | 700/274 |
| 2006/0228281 A1 | * | 10/2006 | Stroder | B01J 8/1818 |
| | | | | 423/212 |
| 2008/0173178 A1 | | 7/2008 | Metteer | |
| 2010/0186645 A1 | * | 7/2010 | Tiegs | F23G 7/065 |
| | | | | 110/210 |
| 2016/0107120 A1 | * | 4/2016 | Hallowell | B01D 53/8696 |
| | | | | 422/109 |
| 2018/0237981 A1 | * | 8/2018 | Glass | F26B 21/001 |
| 2021/0325039 A1 | * | 10/2021 | Maendel | B01D 46/446 |

FOREIGN PATENT DOCUMENTS

| | | | |
|---|---|---|---|
| DE | 102009035714 A1 | | 2/2011 |
| DE | 102013109932 A1 | | 3/2015 |
| DE | 102015103337 A1 | * | 9/2016 |
| DE | 102015103337 A1 | | 9/2016 |
| WO | 2008010242 A1 | | 1/2008 |

\* cited by examiner

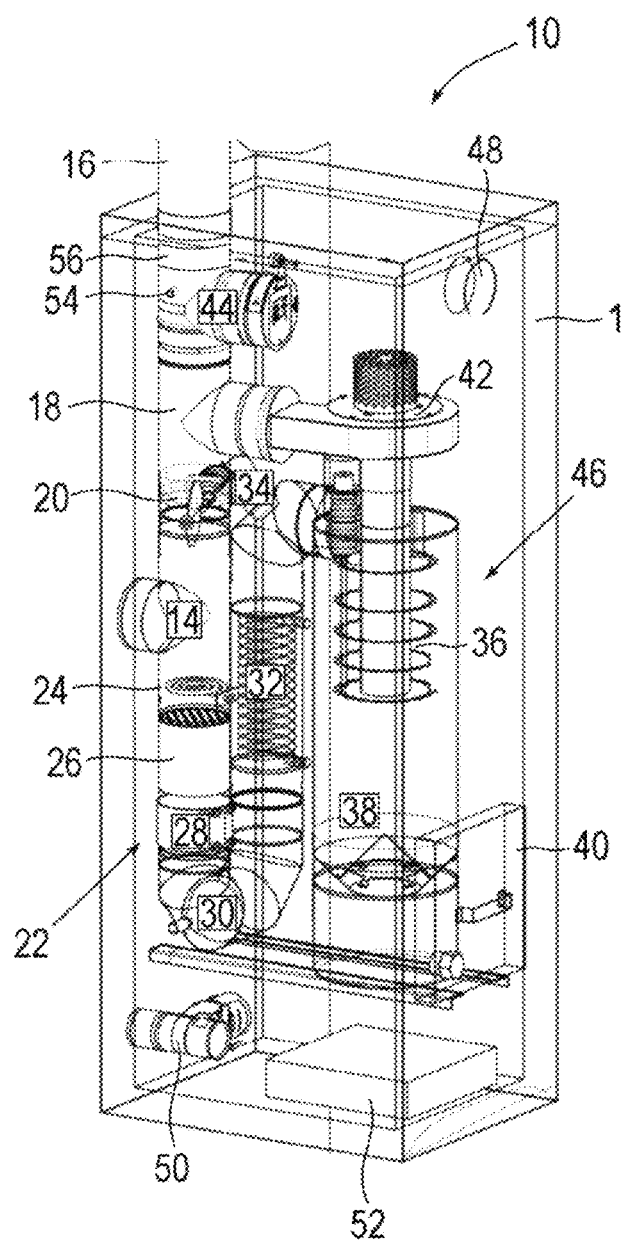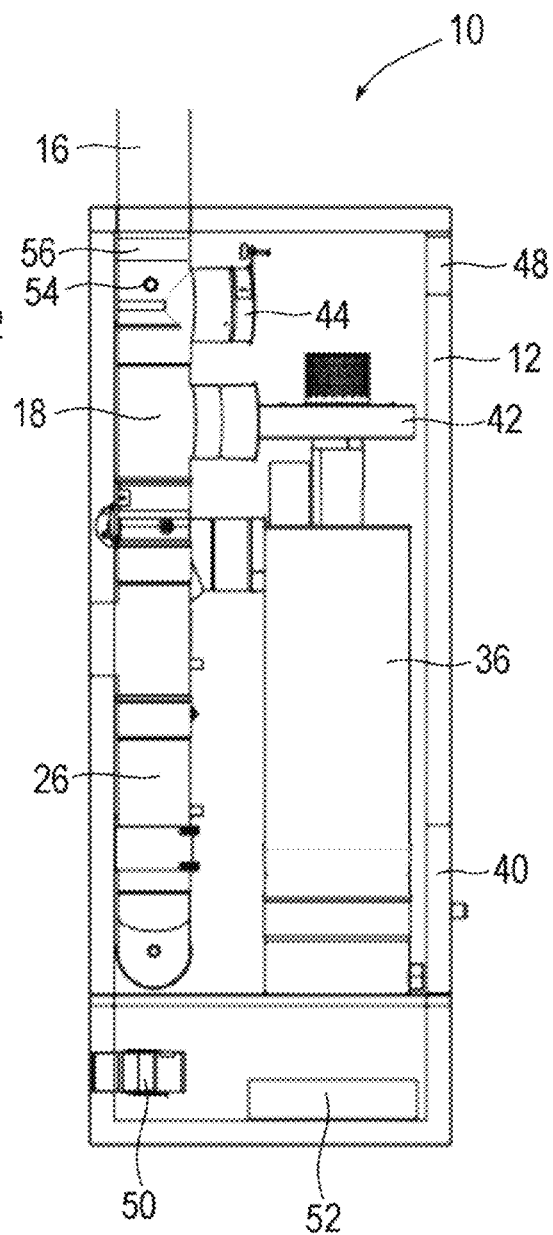

DEVICE FOR PURIFYING EXHAUST GASES FROM A FIREPLACE

CROSS REFERENCE TO RELATED APPLICATION

This application claims priority to German Patent Application No. 10 2020 106 773.9, filed in Germany on Mar. 12, 2020, the entire contents of which are hereby incorporated herein by reference.

The present invention relates to a device for cleaning exhaust gases from a fireplace.

In recent times, due to the increased environmental awareness of the population, attention has focused not only on private transport, but also on the heating of residential homes and commercial premises with fireplaces, such as biomass heating systems. In particular, the filtering of fine dust and harmful accompanying substances from the exhaust gases of such fireplaces is now required by law in many countries, and the World Health Organization is in the process of setting very low limit values for many pollutants. Since it is expected that the requirements for such fireplaces will become even stricter in the future, costly measures for new construction or retrofitting will become necessary for future and existing stoves. The question arises in particular as to what a compact solution for cleaning exhaust gases from fireplaces might look like, which system should be modular if necessary and ideally should clean the exhaust gases from the fireplace to the extent that a chimney can be completely replaced, i.e. only completely cleaned air exits from the device at an acceptable temperature and without any significant pollutants.

Furthermore, for optimal operation of the respective fireplace, it may be desired that it can operate independently of the room air, i.e. that the supply air is provided from outside the corresponding room.

To achieve the above-mentioned objects and to provide a device for cleaning exhaust gases from a fireplace, with which it will be possible to comply even with future limit values for pollutants and which is nevertheless compact and can be easily retrofitted in existing fireplaces, it is proposed according to the invention that said device comprises: a housing which accommodates functional components of the device, an inlet portion which is provided to receive exhaust gases from the fireplace, an outlet portion which is provided to discharge exhaust gases from the device, a bypass portion which is configured to establish a direct connection between the inlet portion and the outlet portion and which can be closed by means of a first mechanical flap arrangement, and a cleaning portion which extends between the inlet portion and the outlet portion for guiding an exhaust gas flow and which is provided with a plurality of functional components. The functional components comprise at least one electrostatic filter unit for separating fine dust particles, a centrifugal separator unit for driving particles out of the exhaust gas and a fan unit for driving the exhaust gas flow through the cleaning portion.

According to the invention, by accommodating functional components and in particular all the components involved in cleaning the exhaust gas within a single housing, it is possible on the one hand to create a compact and user-friendly unit, which on the other hand is also particularly suitable as a retrofit solution for existing fireplaces. The bypass portion is provided to ensure the operational safety of the device in the event of a failure of the device, in particular of the fan unit. Furthermore, the first mechanical flap unit assigned to the bypass portion can serve as a type of throttle flap so that the draught generated by the fan unit can be adjusted by means of the adjustable degree of return.

Furthermore, for safety reasons, the first mechanical flap arrangement can be configured in such a way that it is always open when the device is powered off.

It goes without saying that, in addition to the electrostatic filter unit and the centrifugal separator unit, further functional components can be arranged in the cleaning portion, each of which has a specific effect on individual constituents of the exhaust gases. For example, a catalytic converter unit may be provided for the catalytic treatment of the exhaust gases and may in particular be a catalytic converter having an active coating. In order to achieve optimal efficiency of such a catalytic converter unit even when the exhaust gas is still cold, for example in a state shortly after the fireplace has been put into operation, the device can also comprise an upstream heating device for heating the exhaust gases before they enter the catalytic converter unit so that the exhaust gases can be preheated to an optimised oxidation temperature when they are actually still too cool. For this purpose, an electrically operated heating coil can be considered for example, which is suitably arranged in the exhaust gas flow path upstream of the catalytic converter unit.

Alternatively or additionally, the functional components for treating the exhaust gases in the exhaust gas flow can furthermore comprise an injection unit for spraying a liquid agent and/or an irradiation unit, in particular an ultraviolet irradiation unit. A suitable liquid exhaust gas treatment agent can be sprayed into the exhaust gas flow in the form of very fine droplets, which on the one hand can trigger chemical reactions between the agent and certain gaseous components of the exhaust gas and on the other hand makes it possible for fine dusts to agglomerate early in the treatment chain. The irradiation, in particular by means of an ultraviolet radiation source, can also trigger further chemical reactions in components of the exhaust gas in order to convert them or render them harmless.

In order to allow for an energetically optimised operation of the device according to the invention, said device can also comprise, as a functional component, an exhaust gas heat exchanger, which is configured to extract heat from the exhaust gas flow, and/or a thermoelectric generator and/or a sound absorption element.

In order to also be able to influence the parameters of the combustion process in the fireplace using the device according to the invention, the functional components can further comprise a device for supplying combustion air to the fireplace, wherein this supply device can furthermore comprise at least one of a heating unit for the combustion air, in particular a heat exchanger, which is arranged and configured to transfer heat to the combustion air from the centrifugal separator unit and/or pipes through which exhaust gas flows, and a second mechanical flap unit for controlling the degree of flow of combustion air. By means of these measures, both the temperature and the flow rate of the combustion air supplied to the fireplace can be influenced so that these parameters can each be set to optimal values for the most efficient combustion possible. Furthermore, by supplying combustion air by means of the device according to the invention, the supply of ambient air to the fireplace can be dispensed with if the device itself takes the combustion air from outside the room in which the fireplace is located. Furthermore, the second mechanical flap unit can be used to protect against an unwanted escape of warm air into the environment if said flap is closed when the device is in a cold state.

Furthermore, the device according to the invention can be provided with an optionally controllable draught regulator assigned to the outlet portion, which can be set in such a way that the pressure conditions within the device or in bypass operation the pressure conditions of the fireplace are not negatively influenced by the chimney draught. In embodiments in which the system is operated without a chimney, the air emerging at the outlet portion is to be diverted accordingly.

The device according to the invention can furthermore comprise a control unit which is configured to control at least one of the functional components and/or at least one of the flap arrangements and/or the controllable draught regulator. In the nomenclature of the present application, this control unit is initially not included amongst the functional components since it can be provided either inside or outside the housing of the device and has no direct influence on the exhaust gases to be cleaned. The control unit can be configured with any known means such as, for example, a microcontroller having a permanently installed memory or similar data processing means. Furthermore, the control unit can be in data connection with sensor units that deliver data on the exhaust gases, for example with regard to their temperature, flow rate and/or chemical composition, at one or more positions within the device, and on the basis of said data, the control unit can then make appropriate adjustments to the components of the device controlled by said unit. The control unit can also be used via a communication module to read out various data, such as the operating hours of the device and other parameters. For this purpose, a coupling to a mobile device having dedicated software running thereon or a direct connection of a display device via a wired or wireless connection is conceivable.

Furthermore, positioning means can be assigned to the housing of the device according to the invention, in particular height-adjustable feet and/or a device for attachment to an external component, wherein this facilitates the mounting of the device on already existing fireplaces and wherein, by adapting the positioning of the housing to different types of fireplaces, the device according to the invention can be installed as a "plug and play" component.

By making the housing fireproof in one embodiment of the invention, the device can also be designed to be suitable for installation in living areas.

Furthermore, the device according to the invention can comprise a cleaning connection for an ash extractor in the region of the centrifugal separator unit in order to be able to remove any ash easily and cleanly.

Lastly, the present invention relates to a system for heating a room comprising a fireplace, to a device according to the invention coupled to the fireplace via its inlet portion as just described and optionally a chimney coupled to the outlet portion.

Further features and advantages of the present invention will become even clearer from the following description of an embodiment when said embodiment is considered together with the accompanying drawings. In detail, in the drawings:

FIG. 1 is a schematic isometric view of an embodiment of a device according to the invention, and FIG. 2 is a cross-sectional side view of the device from FIG. 1.

FIGS. 1 and 2 each show an embodiment of a device 10 according to the invention for cleaning exhaust gases from a fireplace (not shown in the drawings). In the schematic isometric view from FIG. 1, part of the housing 12 has been removed in order to highlight the components of the device provided in the interior thereof, while a cross-sectional side view of the same device 10 is shown in FIG. 2. It should also be pointed out that the inside of the housing 12 can be provided with suitable thermal insulation.

With the exception of an inlet portion 14 for receiving exhaust gases from the fireplace (not shown) and an outlet portion 16 for discharging exhaust gases from the device 10, the housing 12 is closed with regard to an exhaust gas flow. Between the inlet portion 14 and the outlet portion 16, a bypass portion 18 is further provided, which can be closed by a first mechanical flap arrangement 20 and forms a direct connection between the inlet portion 14 and the outlet portion 16. For safety reasons, the flap arrangement can in particular be configured in such a way that it is always open when the device 10 is powered off.

On the other hand, a cleaning portion 22 is located inside the housing 12, through which the exhaust gases pass for cleaning purposes when the bypass portion 18 is closed. The functional components provided in this cleaning portion 22, which are described below, can also be arranged in other sequences, and not all of the components have to be installed in every device according to the invention; however, the embodiment shown here represents a particularly advantageous configuration.

The exhaust gas entering through the inlet portion 14 is initially optionally heated by a controllable heating device 24, for example if it is determined by a sensor unit (not shown) that the exhaust gas is still too cool for the subsequent treatment steps or on the basis of a time recording device coupled to the fireplace, by means of which during a warm-up operation of the controlled fireplace, a time can be determined during which the exhaust gases and the subsequent components are not yet in an optimal thermal range to be cleaned.

The exhaust gases then pass through a catalytic converter unit 26 having an active coating for the catalytic treatment of the exhaust gases, which is followed by a thermoelectric generator 28 for generating or recovering energy. Then, an irradiation unit 30, in particular an ultraviolet irradiation unit, can again be provided in order to trigger further chemical reactions in constituents of the exhaust gases.

Within the subsequent riser portion of the cleaning portion 22, an exhaust gas heat exchanger 32 is provided, which is also used to recover thermal energy from the exhaust gases which have now been partially treated. At the upper end of the above-mentioned riser portion, there is also an injection unit 34 for injecting a liquid exhaust gas treatment agent, which can contribute on the one hand to a chemical conversion of undesired gaseous components of the exhaust gases and on the other hand to an agglomeration of fine dust components of the exhaust gases.

The exhaust gases then reach the region of an electrostatic filter unit 36 for separating fine dust particles in which the particles agglomerate with one another as a result of electrostatic charging, and larger particles that are easier to separate are formed. These are in turn collected by means of a centrifugal separator unit 38 and can be removed and disposed of via an opening 40 at a given time. In particular, a cleaning connection for an ash extractor can be provided at this point. The separator unit 38 can comprise, for example, a direct-current or cross-flow cyclone.

Lastly, the exhaust gases, which have meanwhile been cleaned, pass through a fan unit 42 by means of which a suction effect is generated to drive the exhaust gases through the components described above. Then, the exhaust gases can finally be fed to the outlet portion 16 and discharged through said outlet portion, for example to a downstream chimney (not shown), wherein for adjustment thereof an optionally controllable draught regulator 44 is arranged in the region of the outlet portion 16.

In addition to the cleaning portion 22 for exhaust gases described above, the device 10 further comprises a supply device 46 for supplying combustion air from the surroundings of the device 10 to the fireplace (not shown). This supply device 46 comprises, in particular, an inlet opening 48 for fresh air from the surroundings of the device 10 and a combustion air supply 50 to the combustion chamber of the fireplace that can be controlled by means of a second mechanical flap unit. Since the air extracted at the inlet opening 48 comes from outside the room in which the fireplace is located, it can be completely independent of the ambient air. This can be achieved, for example, by connecting a nozzle of a pipe which exits from the corresponding room to the inlet opening 48 or by arranging the device 10 itself outside the relevant room. In such a case, only one pipe would then have to be provided between the fireplace and the inlet portion 14 as well as the combustion air supply 50.

When the device 10 is being operated, the heat extracted from the exhaust gas in the heat exchanger 32 can, for example, be transferred to the combustion air to be supplied to the combustion chamber such that the second mechanical flap and the heat exchanger 32 can be used to adjust the combustion air in terms of its quantity and temperature for optimally efficient operation of the fireplace.

Furthermore, reference should be made to the control unit 52, located on the bottom of the housing 12 of the device 10, which is in data connection with all the controllable components described above for controlling said device 10 and is coupled to sensor units for detecting parameters of the exhaust gas and/or the combustion air in order to be able to perform control processes by using the components described above for optimal operation of the device 10. Purely by way of example for a sensor unit of this type, the reference numeral 54 indicates a connection for a measuring probe for recording the properties of the cleaned exhaust gases in the region of the outlet portion 16.

Furthermore, the control unit can be used via a communication module (not shown) to read out various data, such as the operating hours of the device and other parameters. For this purpose, a coupling to a mobile device having dedicated software running thereon or a direct connection of a display device via a wired or wireless connection is conceivable.

Lastly, the drawings show a sound absorption element 56 for structure-borne noise and airborne noise directly in front of the outlet portion 16, which sound absorption element is used for noise minimisation and housing insulation purposes.

The invention claimed is:

1. A device for cleaning exhaust gases from a fireplace, comprising:
    a housing which accommodates functional components of the device;
    an inlet portion which is provided to receive exhaust gases from the fireplace;
    an outlet portion which is provided to discharge exhaust gases from the device, wherein a controllable draught regulator is assigned to the outlet portion;
    a control unit configured to:
        receive, via one or more sensor units in communication with the control unit, data regarding the exhaust gases; and
        adjust, based on the data, the controllable draught regulator to prevent a negative influence of a chimney draught on pressure conditions within the device or on pressure conditions within the fireplace;
    a bypass portion configured to establish a direct connection between the inlet portion and the outlet portion and which can be closed by means of a first mechanical flap arrangement; and
    a cleaning portion extending between the inlet portion and the outlet portion for guiding an exhaust gas flow, wherein the cleaning portion is provided with functional components comprising:
        an electrostatic filter unit for separating fine dust particles;
        a centrifugal separator unit for removing particles from the exhaust gas; and
        a fan unit for driving a flow of the exhaust gas through the cleaning portion.

2. The device of claim 1, wherein the first mechanical flap arrangement is configured such that the bypass portion is open when the device is powered off.

3. The device of either claim 1, wherein the functional components further comprise:
    a catalytic converter unit for catalytic treatment of the exhaust gases, and an upstream heating device for heating the exhaust gases.

4. The device of claim 1, wherein the functional components for further comprise one or more of:
    an injection unit for spraying a liquid agent; or
    an irradiation unit.

5. The device of claim 4, wherein the irradiation unit comprises an ultraviolet irradiation unit.

6. The device of claim 1, wherein the functional components further comprise one or more of:
    an exhaust gas heat exchanger, which is configured to extract heat from the exhaust gas flow;
    a thermoelectric generator; or
    a sound absorption element.

7. The device of claim 1, wherein the functional components further comprise:
    a supply device for supplying combustion air to the fireplace.

8. The device of claim 7, wherein the supply device for supplying combustion air comprises at least one of the following:
    one or more of a heating unit for the combustion air arranged and configured to transfer heat from the centrifugal separator unit or pipes through which exhaust gas flows to the combustion air; and
    a second mechanical flap unit for controlling a flow rate of combustion air.

9. The device of claim 8, wherein the heating unit comprises a heat exchanger.

10. The device of claim 1, wherein the control unit is further:
    configured to control one or more of (i) at least one of the functional components, or (ii) at least one of the first mechanical flap arrangement.

11. The device of claim 1, wherein the control unit is accommodated within the housing.

12. The device of claim 1, wherein the housing comprises positioning means.

13. The device of claim 12, wherein the positioning means comprise one or more of height-adjustable feet or a device for fastening the housing to an external component.

14. The device of claim 1, wherein the housing is fireproof.

15. The device of claim 1, further comprising a cleaning connection for an ash extractor in a region of the centrifugal separator unit.

16. A system for heating a room comprising:
a fireplace; and
a device, comprising:
   a housing which accommodates functional components of the device;
   an inlet portion which is provided to receive exhaust gases from the fireplace;
   an outlet portion which is provided to discharge exhaust gases from the device, wherein a controllable draught regulator is assigned to the outlet portion;
   a control unit configured to:
      receive, via one or more sensor units in communication with the control unit, data regarding the exhaust gases; and
      adjust, based on the data, the controllable draught regulator to prevent a negative influence of a chimney draught on pressure conditions within the device or on pressure conditions within the fireplace;
   a bypass portion which is configured to establish a direct connection between the inlet portion and the outlet portion and which can be closed by means of a first mechanical flap arrangement; and
   a cleaning portion which extends between the inlet portion and the outlet portion for guiding an exhaust gas flow and which is provided with functional components, wherein the functional components comprise:
      an electrostatic filter unit for separating fine dust particles;
      a centrifugal separator unit for removing particles from the exhaust gas; and
      a fan unit for driving a flow of the exhaust gas through the cleaning portion,
   wherein the device is coupled to the fireplace through its inlet portion and a chimney coupled to the outlet portion.

17. The system of claim 16, wherein the first mechanical flap arrangement is configured to be open when the device is powered off.

18. The system of claim 16, wherein the functional components further comprise:
   a catalytic converter unit for catalytic treatment of the exhaust gases, and
   an upstream heating device for heating the exhaust gases.

19. The system of claim 16, wherein the functional components further comprise one or more of:
   an injection unit for spraying a liquid agent; or
   an irradiation unit, in particular an ultraviolet irradiation unit.

20. The system of claim 16, wherein the functional components further comprise:
   an exhaust gas heat exchanger, which is configured to extract heat from the exhaust gas flow;
   a thermoelectric generator; or
   a sound absorption element.

* * * * *